US011822570B2

(12) United States Patent
Koul et al.

(10) Patent No.: US 11,822,570 B2
(45) Date of Patent: Nov. 21, 2023

(54) DATABASE SYNCHRONIZATION EMPLOYING PARALLEL POLL THREADS (71) Applicant: INTERNATIONAL BUSINESS MACHINES CORPORATION, Armonk, NY (US)

(72) Inventors: Ankush Koul, Jammu (IN); Anshul Kumar Purohit, Gaithersburg, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 17/518,143

(22) Filed: Nov. 3, 2021

(65) Prior Publication Data

US 2023/0134092 A1 May 4, 2023

(51) Int. Cl.
*G06F 16/27* (2019.01)
(52) U.S. Cl.
CPC .................... *G06F 16/27* (2019.01)
(58) Field of Classification Search
CPC ......... G06F 16/27; G06F 16/273; G06F 16/23
USPC ........................................................ 707/634
See application file for complete search history.

(56) References Cited

U.S. PATENT DOCUMENTS

| 8,341,134 | B2 | 6/2012 | Bourbonnais |
| 10,452,637 | B1 | 10/2019 | Jones et al. |
| 10,719,532 | B2 * | 7/2020 | Goldberg ............. G06F 16/2358 |
| 10,902,015 | B2 | 1/2021 | Bourbonnais |
| 11,003,652 | B1 * | 5/2021 | Li ........................ G06F 16/2343 |
| 2019/0197027 | A1 | 6/2019 | Guo et al. |
| 2019/0236081 | A1 * | 8/2019 | Park ...................... G06F 16/951 |

FOREIGN PATENT DOCUMENTS

CN 109766328 A 5/2019

OTHER PUBLICATIONS

Mell, Peter, et al., "The NIST Definition of Cloud Computing," Sep. 2011, 7 pages.
International Search Report issued in corresponding PCT Application Serial No. PCT/EP2022/079962 dated Jan. 31, 2023, 5 pgs.

* cited by examiner

*Primary Examiner* — Michael Pham
(74) *Attorney, Agent, or Firm* — Tutunjian & Bitetto, P.C.; Michael A. Petrocelli (57) ABSTRACT

Database synchronization by initiating a transaction to synchronize data from a source database to a target database. The source database issues a trigger that provides a sequence identification (ID) and calculates a thread number that is employed for syncing the rows from the source database to the target database based on a primary key hash. The sequence identification (ID) and the thread number from the source database is inserted into a synchronization (SYNC) table. Data synchronization may also include picking the rows that are allotted their thread number from the SYNC table using polling threads. The rows from the SYNC table may be replicated into target database using a sequence provided by the sequence identification and thread number.

20 Claims, 9 Drawing Sheets

DATABASE SYNCHRONIZATION EMPLOYING PARALLEL POLL THREADS

BACKGROUND

The present disclosure generally relates to database management, and more particularly to database synchronization.

Modernizing legacy applications is an ongoing interest in computing applications. To modernize a client's application it is critical to identify each aspect of the application.

Enterprises maintain traditional databases, such as relational databases for processing online transaction processing (OLTP) workloads for their users/customers. As the size of the data in relational databases increases, the performance of the relational database becomes a concern. Further, because of the increasing size of the relational databases, accessing and retrieving data from the plurality of tables in the relational databases becomes difficult. Additional difficulties are faced by users employing more advanced technologies as they are developed. For example, mobile technologies require quick response, high speed data processing and analytical reporting. Enterprises can prefer changing databases from relational database management systems (RDMS) to non-relational database management (noSQL). However, during database migration, enterprises do prefer to synchronize the data between both databases to avoid any impact on the downstream systems. In other instances, the enterprises can prefer to use a hybrid data management system, e.g., relational database management systems (RDMS) plus non-relational (NoSQL). Furthermore, it is desired that changes, e.g., inserts, deletes, and updates, to rows of the table in the first database be copied (replicated) to the table copies residing in the other databases.

SUMMARY

Database synchronization is described that parallelly processes data from a single sync table through multiple threads having an assigned order to the target data storage. The methods, systems and computer program products execute triggers that calculate an ID sequence and calculate a thread number responsible for syncing the row based on the primary key hash. This data can be inserted into the sync table. Multiple polling threads then parallelly pick the rows that are allotted their thread number from the sync table, and then replicate the rows into the target store. The thread number assignment mechanism that is in each row ensures that the dependent updates (having the same primary key) are picked by the same thread and the sequence number ensures that the updates are replicated in order.

In accordance with the methods, systems and computer program products of the present disclosure, each polling thread picks only those records from the sync table that have been pre-assigned a thread number that matches their own. This pre-assignment is done by the triggers while inserting rows into the sync table. The polling threads receive data ordered by sequence identification (ID) to maintain ordering in the target database.

The methods, systems and computer program products described herein can minimize the latency of data synchronization between source and target data stores by aggregating all the data that needs to be synchronized in a common table (sync table) and then running parallel polling threads against this common table with each thread processing specific set of rows from the common table and syncing them to the target datastore.

In accordance with one aspect of the present disclosure, a computer-implemented method for database synchronization is described that parallelly processes data from a single sync table through multiple threads having an assigned order to the target data storage. The method may begin with initiating a transaction to synchronize data from a source database to a target database. The source database contains a trigger that calculates a sequence identification (ID) and calculates a thread number that is employed for syncing the rows from the source database to the target database based on a primary key hash. In a following step, the sequence identification (ID) and the thread number from the source database is inserted into a synchronization (SYNC) table. Polling threads can then parallelly pick the rows that are allotted their thread number from the sync table and then replicate the rows into target storage, to replicate data from the source database to the target database.

In some embodiments, the data from the source database is recorded in the target database from the multiple and parallel polling threads using the sequence identification (ID) and pre-allocated thread number from the SYNC table. In some embodiments, the processing threads employ the sequence number and thread number to pick records.

In another aspect, a system is described for database synchronization that includes a hardware processor; and a memory that stores a computer program product. The computer program product when executed by the hardware processor, causes the hardware processor to initiate a transaction to initiate a transaction to synchronize data from a source database to a target database. The source database contains a trigger that calculates a sequence identification (ID) and calculates a thread number that is employed for syncing the rows from the source database to the target database based on a primary key hash. In a following step, the computer program product employing the hardware process can insert the sequence identification (ID) and the thread number from the source database into a synchronization (SYNC) table. The computer program product when executed by the hardware processor can then using polling threads parallelly pick the rows that are allotted their thread number from the sync table and then replicate the rows into target storage, to replicate data from the source database to the target database.

In some embodiments, the data from the source database is recorded in the target database from the multiple and parallel polling threads using the sequence identification (ID) and pre-allocated thread number from the SYNC table. In some embodiments, the processing threads employ the sequence number and thread number to pick records.

In another aspect, a computer program product for database synchronization is described that includes a computer readable storage medium having computer readable program code embodied therewith. The program instructions executable by a processor to cause the processor to initiate a transaction to synchronize data from a source database to a target database. The source database contains a trigger that calculates a sequence identification (ID) and calculates a thread number that is employed for syncing the rows from the source database to the target database based on a primary key hash. In a following step, the computer program product can insert, using the processor, the sequence identification (ID) and the thread number from the source database into a synchronization (SYNC) table. The computer program product can then parallelly pick the rows that are allotted their thread number from the sync table using polling threads and then replicate the rows into target storage, to replicate data from the source database to the target database.

BRIEF DESCRIPTION OF THE DRAWINGS

The following description will provide details of preferred embodiments with reference to the following figures wherein.

DETAILED DESCRIPTION

The methods, systems, and computer program products described herein relate to methods and systems for database synchronization. Database synchronization ensures data consistency between two or more databases. In the simplest case, changes to the source database are applied to the target database. There are different types of synchronization that can include insert synchronization, update synchronization, drop synchronization and mixed synchronization. The methods, systems and computer program products in performing database synchronization can parallelly pick updates on the source database (SYNC table) with preservation of the source update ordering of dependent updates. The methods, systems and computer program products can then replicate the information into the target storage, e.g., database. Generally, to replicate the one database to the update to the other data store, e.g., database, enterprises can implement a trigger based solution.

There is a need for a solution to parallelly pick the updates from one database (sync table) to replicate into the other data storage with an ordered delivery to the target database. In some embodiments, the methods systems and computer program products that are describe herein can replicate data using parallel threads with guaranteed ordering of data for a particular primary key, e.g., primary key hash.

The methods, systems and computer systems described herein can parallelly pick the data from the source database with ordering maintained for dependent updates and replicate it into the target store in near real time in an asynchronous mode using a trigger based solution. By employing the parallel implementation for picking from the source database for being transferred to the target database, the methods, systems and computer program products that are described herein can reduce data latency between the different stores, e.g., databases, during data synchronization. Additionally, the methods, systems and computer program products can provide scalability to process source database updates, reduce data latency between different databases, achieve data integrity between the different databases, can provide real time data synchronization between different databases, and have no impact on downstream systems during database migration phases. The methods, systems and computer program products are now described herein in greater detail with reference to FIGS. 1-9.

The present method is focused on parallelly processing data from a single SYNC table by multiple threads with guaranteed ordered delivery to target data store.

In some embodiments, the methods, systems and computer program products of the present disclosure include a trigger to calculate a sequence ID and calculate a thread number responsible for syncing the row based on the primary key hash for providing the order in which data is recorded in the target storage from the source database. The sequence ID and thread number for syncing the row based on the primary key hash for providing order is data that is inserted into a SYNC table. Multiple polling threads then parallelly pick the rows that are allotted their thread number from the SYNC table and then replicate the rows into target store. In some embodiments, the thread number assignment mechanism to each row ensures that the dependent updates (having the same primary key) are always picked by the same thread, and the sequence number ensures that the updates are replicated in order.

In accordance with the methods, systems and computer program products described herein, each polling thread picks only those records from the SYNC table that have been pre-assigned a thread number that matches their own. This pre-assignment is done by the triggers while inserting rows into the SYNC table. The polling threads receive data ordered by sequence ID to maintain ordering in the target database.

In some embodiments, the methods, systems and computer programs that are described herein can minimize the latency of data synchronization between source and target data stores by aggregating all the data that needs to be synchronized in a common table (SYNC table) and then running parallel polling threads against this common table with each thread processing specific set of rows from the common table and syncing them to the target datastore.

Figure 5:
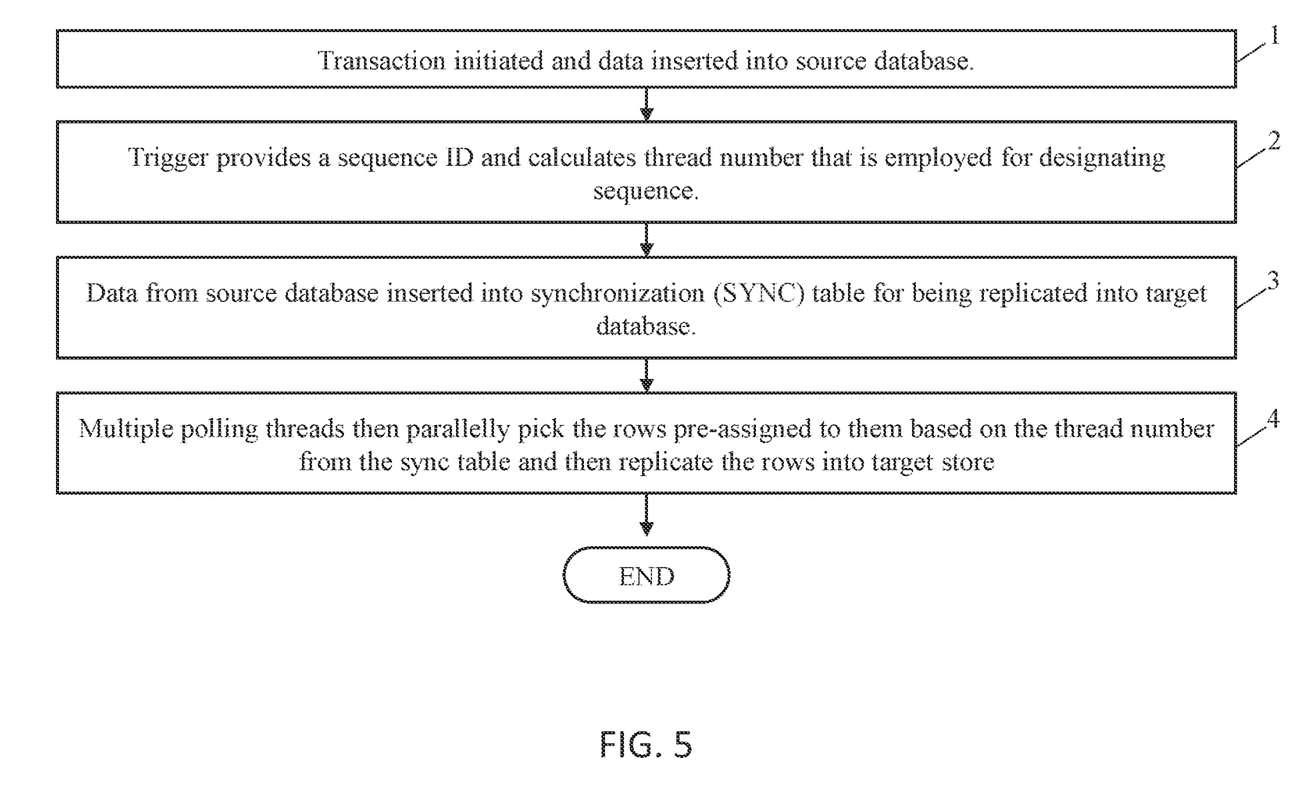
FIG. 5 is a flow/block diagram showing one embodiment a method for database synchronization using multiple and parallel poll threads, in accordance with some embodiments of the present disclosure.
Figure 6:
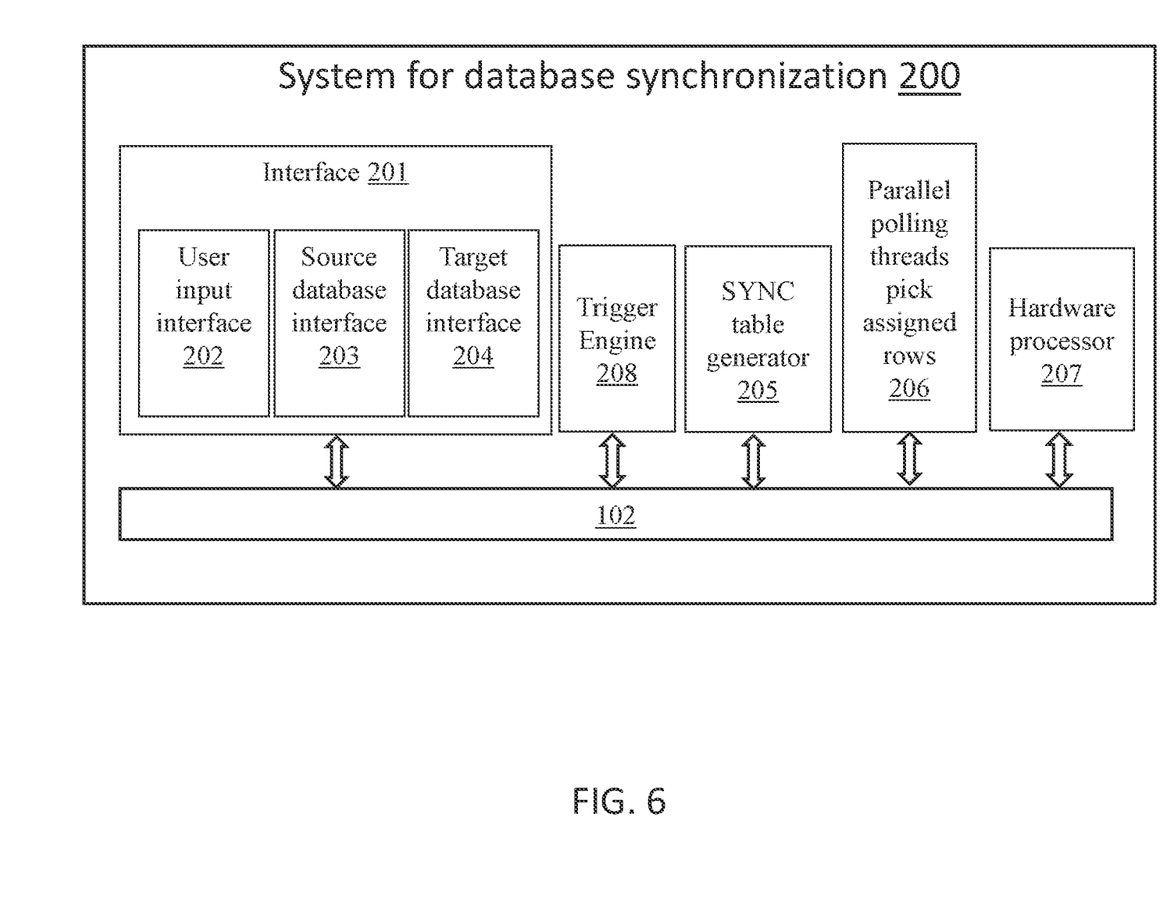
FIG. 6 is a system for database synchronization using multiple and parallel poll threads, in accordance with some embodiments of the present disclosure.

FIGS. 1-4 illustrate example environments, in which the systems and methods of the present disclosure operate during database synchronization to parallelly pick the data from the source database with ordering maintained for updates and replicate it into the target storage, e.g., target database. In the examples depicted in FIGS. 1-4, the target database may be a cloud based database or application, which in some instances can be a hybrid cloud database or application. FIG. 5 is a flow/block diagram showing one embodiment a method for database synchronization using multiple and parallel poll threads. FIG. 6 is a system for database synchronization using multiple and parallel poll threads.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
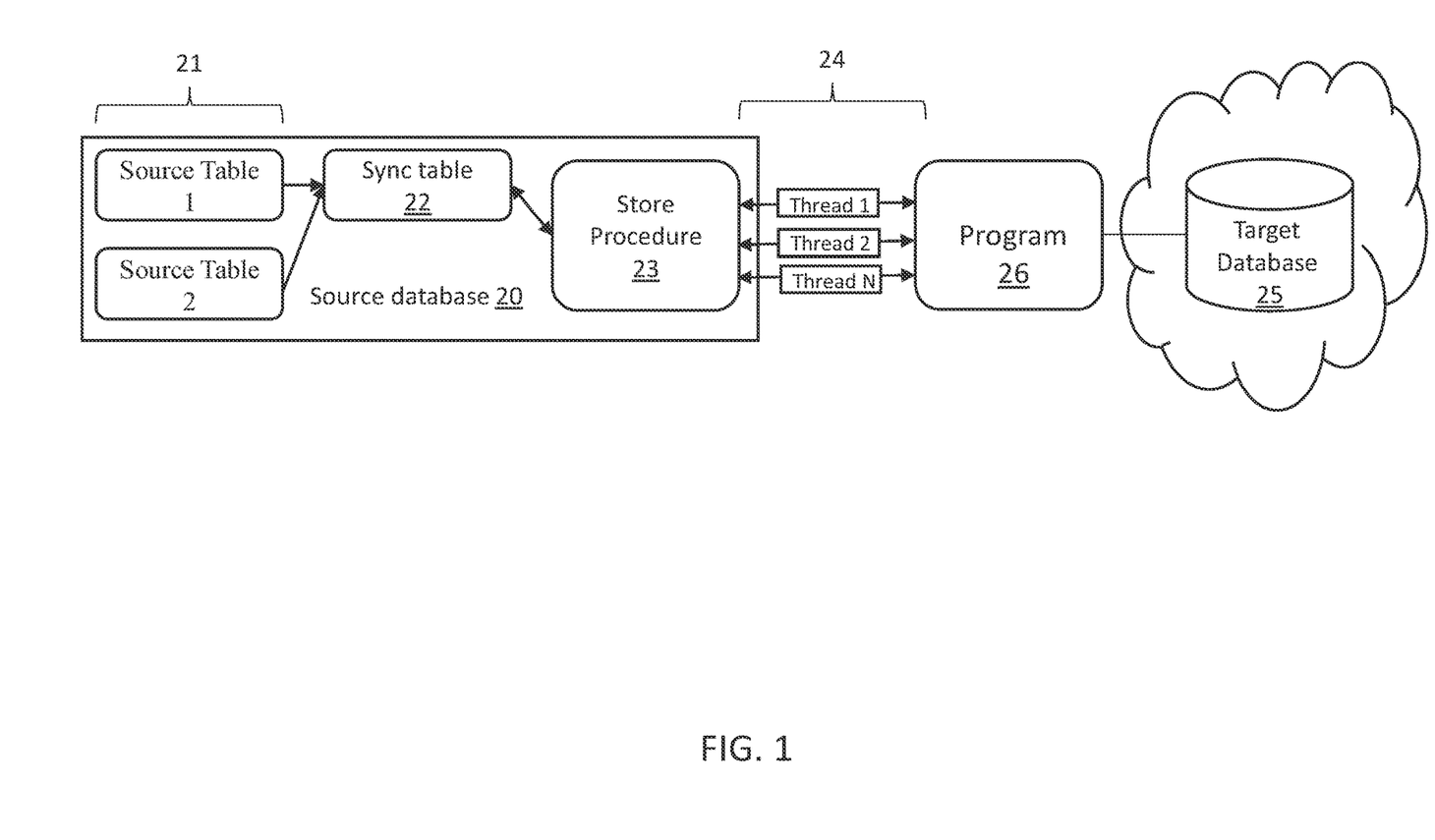
FIG. 1 is an illustration of an example environment illustrating database synchronization using multiple and parallel poll threads, in accordance with some embodiments of the present disclosure.

FIG. 1 illustrates one example of database synchronization that can be performed using the methods and systems described herein. The database synchronization may be employed to move enterprise systems and data from a source database 20 to a target database 25. The synchronization can include insert synchronization, update synchronization, drop synchronization and mixed synchronization. The transfer of data may be from a relational database management systems (RDMS) database to non-relational (NoSQL) database. In some embodiments, the transfer of data may be from a relational database management systems (RDMS) to a hybrid of relational database management systems plus non-relational (NoSQL) databases.

In the example depicted in FIG. 1, the source database 20 may include at least one source table database 21. In the example depicted in FIG. 1 only two source table databases 21, i.e., source table 1 and source table 2, are depicted, however, the present disclosure is not limited to only this example, For example, more than two source tables may be employed in the source database 20.

Still referring to FIG. 1, there may be a synchronization table entry defined for each table, e.g., source table 1 and source table 2, that is synchronized. The synchronization table 22 stores settings, such as the direction of synchronization. In some examples, each client requesting synchronization can request only the tables that it needs. This might not include all the tables that the server synchronization provider makes available. A program 26 may be used for retrieving the threads, reading sequence information and updating the data in the target database in accordance with the sequence information. FIG. 1 further illustrates that the target database 21 may be cloud based 50. For example, the cloud base database may be a hybrid cloud arrangement.

Figure 2:
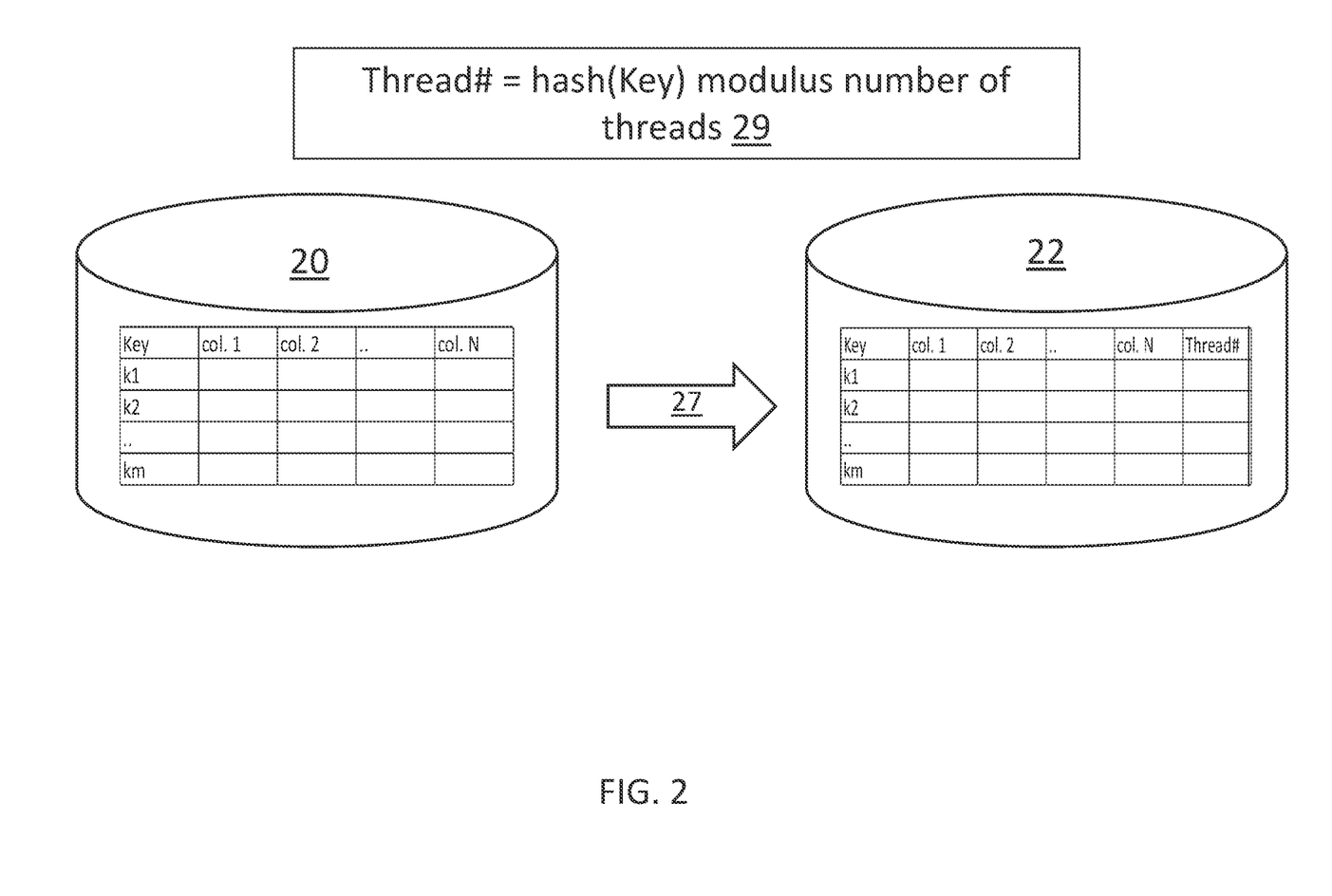
FIG. 2 is an illustration of one embodiment of thread assignments for the database synchronization methods of the present disclosure.

FIG. 2 further illustrates the interaction between the source table databased 21 and the SYNC table 22. FIG. 2 illustrates an example of thread assignment to each record. The source database table 21 may include a table having primary key values in the column noted as KEY. FIG. 2 further illustrates a trigger 29 that begins when the transfer of data from the source database 20 to the target database 21.

One function of the trigger 29 includes that thread number (thread #) is pre-assigned to the records stored in the SYNC table 22. In some embodiments, the logic is to run the primary key of the record through a hash function and then divide the hashed value with the number of parallel threads, in which the remainder from this operation is the thread number. In one example, the record having primary key ABC gets updated on source database 20. The trigger 29 fires and calculates the thread number by hashing ABC to get a hashed value (e.g., 43) and then dividing the hash value by total number of processing threads (e.g., 6) to get a remainder (e.g., 1 in this scenario). This remainder is the thread number. In this example, the thread numbers can be 0,1,2, 3,4,5 (all possible remainders from division by 6). In this example, six threads T0, T1, T2, T3, T4, T5 will pick the records—T0 picks records with thread #0, T1 picks records with thread #1, T2 picks records with thread #2, T3 picks records with thread number #3, T4 picks records with tread number #4, and T5 picks records with thread number #5.

The primary key values are illustrated as K1, K2 and Km. The KEY provides the sequence of data. The source database table may also include data arranged in rows (m=number of rows) and columns (n=number of columns). Each entry in the source database table 21 may include data that is to be synchronized to the target storage. The synchronization uses the sequence from the key.

As depicted in FIG. 2, each source database table 21 has an entry recorded in the SYNC table 22. The sync table 22 includes a plurality of columns and rows for temporarily storing data for a synchronization operation. The first column of the sync table 22 may include the sequence in which the data from the source database table 21 is recorded in the sync table 22. The next column is key data (key) corresponding to the key data from the source database table 21. The final column of the sync table is the assigned thread number (thread #). A thread is a sequence of instructions that runs independently of the program and of any other threads. Using threads, a multi-threaded server program can accept a connection from a client, start a thread for that communication, and continue listening for requests from other clients. In some embodiments, the threads are always running and polling for data. The trigger 29 can be a command to initiate database synchronization. The trigger 29 inserts data in the SYNC table 22 along with a sequence number (calculated from a sequence object) and a thread number.

Figure 3:
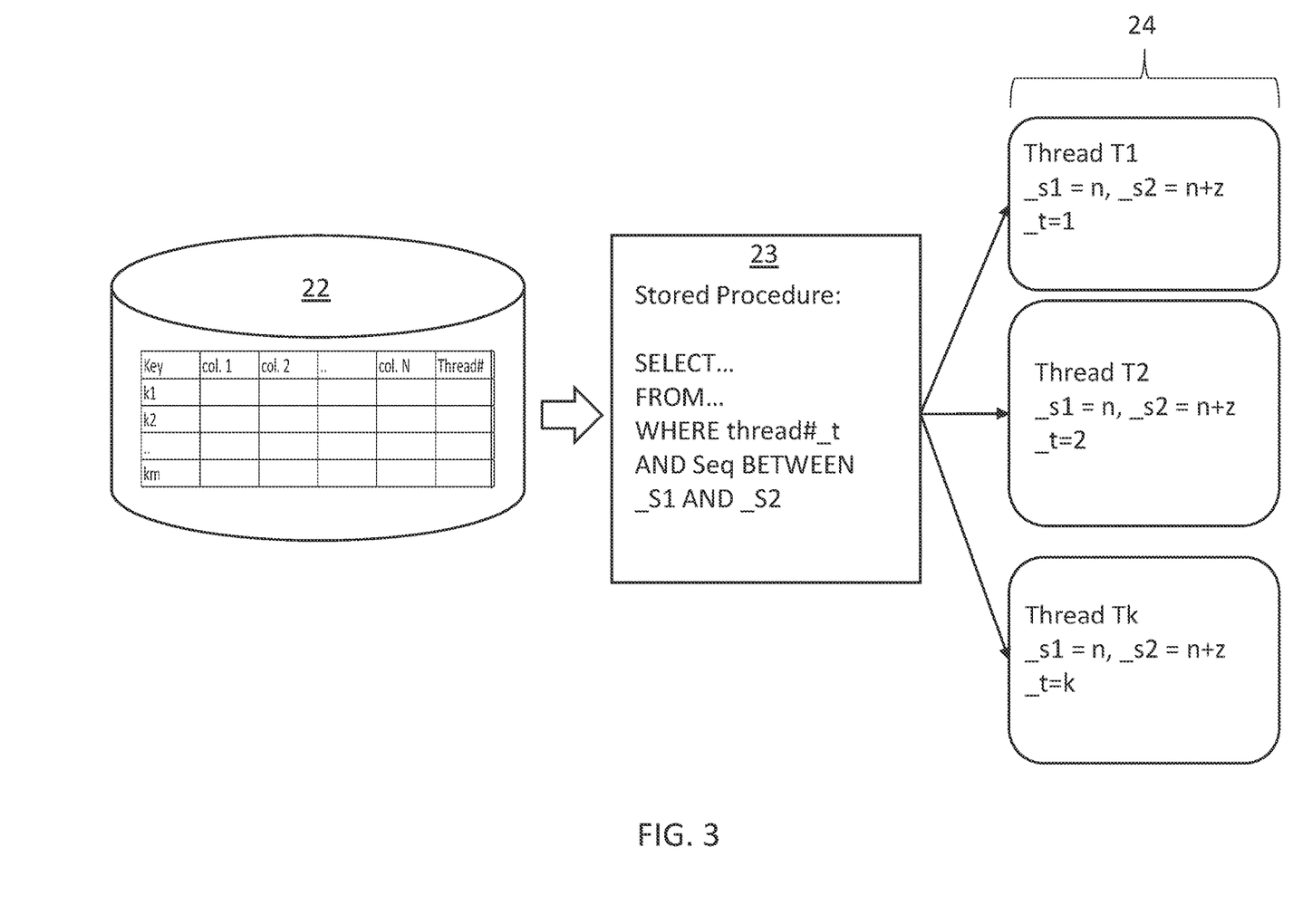
FIG. 3 is an illustration of one embodiment of parallel poll threads being used to reduce latency issues in database synchronization, as employed in the methods, systems and computer program products of the present disclosure.

Referring back to FIG. 1, from the SYNC table 22, a stored procedure 23 executes the multiple and parallel poll threads 24 to perform database synchronization. In the embodiment that is depicted in FIG. 1, three poll threads, i.e., Thread 1, Thread 2, Thread N, are depicted. However, this example is provided for illustrative purpose only, and the methods, systems and computer program products of the present disclosure are not limited to only this example. Any number of threads that are suitable for performing database synchronization, which can be fed into a replicating program 26 that replicates the data in the number of threads in the target database 25. As illustrated in FIG. 1, the target database 25 may be in a cloud environment 50. FIG. 3 illustrates one embodiment of parallel poll threads from the sync table 22 of the source database 20 to the target database 25. The sync table 22 depicted in FIG. 3 has been described above with reference to FIG. 2. The stored procedure 23 includes information designating the source of the data, e.g., source database 20, and the sequenced in which the polling threads are to be recorded in the target database 25. The polling threads 24 are tagged with this information as depicted in FIG. 3. In the depicted tags, the following notations are applicable: K is equal to the number of parallel poll threads; T1, T2, T3 is a thread assignment; _s1 and _s2 is the lower and upper bound for sequence numbers; z is the max result set size, and _t is the thread number.

Figure 4:
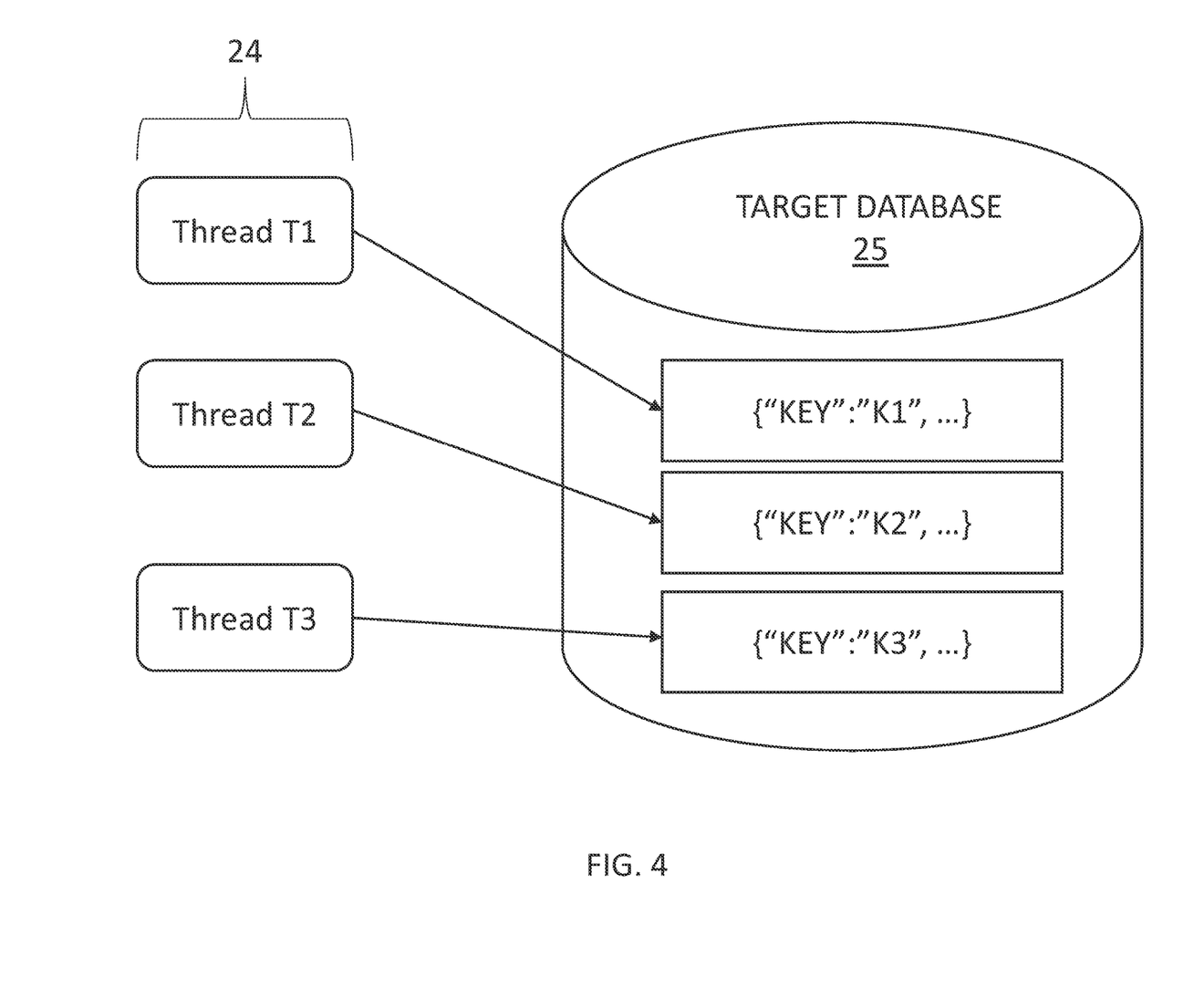
FIG. 4 is an illustration of ordered delivery to a target database using the database synchronization method, in which each polling thread picks only those records from the SNYC table that have been pre-assigned a thread number that matches their own, in accordance with one embodiment of the present invention.

Referring to FIG. 4, from the polling threads 24 and the tags provided by the stored procedure 23, the data carried by the parallel and multiple poll threads 24 can be recorded in the target storage, e.g., target database 25. As illustrated, for the key, i.e., K1, K2, K3, from each thread 24 that was recorded in the sync table 22 is reproduced in the target database 25 in the sequence matching the sync table 22. This can be the result of the tagging from the polling threads 24 depicted in FIG. 3. The recordation of the data from the parallel and multiple polls 24 is done in real time and simultaneously, which is contrary to methods that record each poll, i.e., one poll, of data one at a time, e.g., sequentially.

FIG. 5 is a flow/block diagram showing one embodiment a method for database synchronization using multiple and parallel poll threads 24, which can produce the scenarios and events that are depicted in FIGS. 1-4.

At block 1, the method may begin with the user initiating the transaction to synchronize the data in a source database to a target database. As noted, in one application, the data may be synchronized from a relational database management systems (RDMS) database to non-relational (NoSQL) database. In some embodiments, the transfer of data may be from a relational database management systems (RDMS) to a hybrid of relational database management systems plus non-relational (NoSQL) databases. These databases may be cloud based.

Referring to FIG. 6, in some embodiments, a system for database synchronization 200 is provided, in which an interface 201 is present that includes at least an input interface 202 from a user that wants to have data synchronized between two database. The interface 201 also includes a source database interface 202 and a target database interface 203. Through these interfaces information can be provided for transmitting data as part of the sequence process.

At block 2, the trigger 27 is executed. In some embodiments, the source database 20 issues a trigger 27 that provides a sequence identification (ID) and calculates a thread number that is employed for syncing the rows from the source database 20 to the target database 25 based on a primary key hash. Referring to FIG. 6, the system may include a trigger engine 208 for performing the operations described with reference to block 2 of FIG. 5.

Referring to block 3, the rows from the source database 21 are inserted into the SYNC table 22. Referring to FIG. 6, the system 200 can include the SYNC table generator 205 for recording the sequences and data from the source table for the purposes of synchronization. The SYNC table generator 205 may include memory storing a set of instructions that when executed by a hardware processor can record data and sequence information from the source database 20 that may be in contact to the synchronization system 200 through interface 202.

At block 4, the method can continue with simultaneously generating multiple and parallel polling threads. The multiple and parallel polling threads can be generated using the store procedure. Referring to FIG. 6, the system 200 can include the parallel thread poll generator 206 for generating the parallel threads used for data synchronization. The parallel thread poll generator 206 may include memory storing a set of instructions that when executed by a hardware processor that can generator the parallel threads for transmission to the target database 25 that may be in contact to the synchronization system 200 through interface 204.

At block 4, from the multiple and parallel polling threads the data from the source database 21 is reproduced in the target database 25 using the sequence from the SYNC table 22. As noted, the target database 25 could be a cloud based database. The data being reproduced on the cloud based database, could be purely informational data, or the data could be for the purposes of running applications in their entirety, e.g., the data is an application/program. The system 200 may have an interface, e.g., target database interface 204, by which the system can send the multiple and parallel polling threads of data for recording database information to the target database 25 for the purpose of synchronizing the data with the source database 20. This can include complete replication, partial replication, updating specific entries of data, and deleting entries of data etc. A complete ordered set of data can be sent using parallel polling threads from the system 200 to the target database 25. FIG. 6 is system 200 for database synchronization using multiple and parallel poll threads. In one embodiment, the system includes a hardware processor 207; and a memory that stores a computer program product. The computer program product when executed by the hardware processor, causes the hardware processor to initiate a transaction to synchronize data from a source database 20 to a target database 25. In some examples, the source database 20 issues a trigger that provides a sequence identification (ID) and calculates a thread number that is employed for syncing the rows from the source database to the target database based on a primary key hash, which can be performed using the trigger engine 28 of the system 200. Data from the source database 20 into a synchronization (SYNC) table 22. These steps can be performed by the SYNC table generator 205. The computer program product of the system can also record a sequence for the data from the source database in the SYNC table; and generate multiple and parallel polling threads for transmitting data from source database to the target database 25. The multiple and parallel polling threads can be produced by the parallel thread poll generator 206. The system 200 can also record the data from the source database in the target database from the multiple and parallel polling threads using the sequence from the SYNC table.

Figure 7:
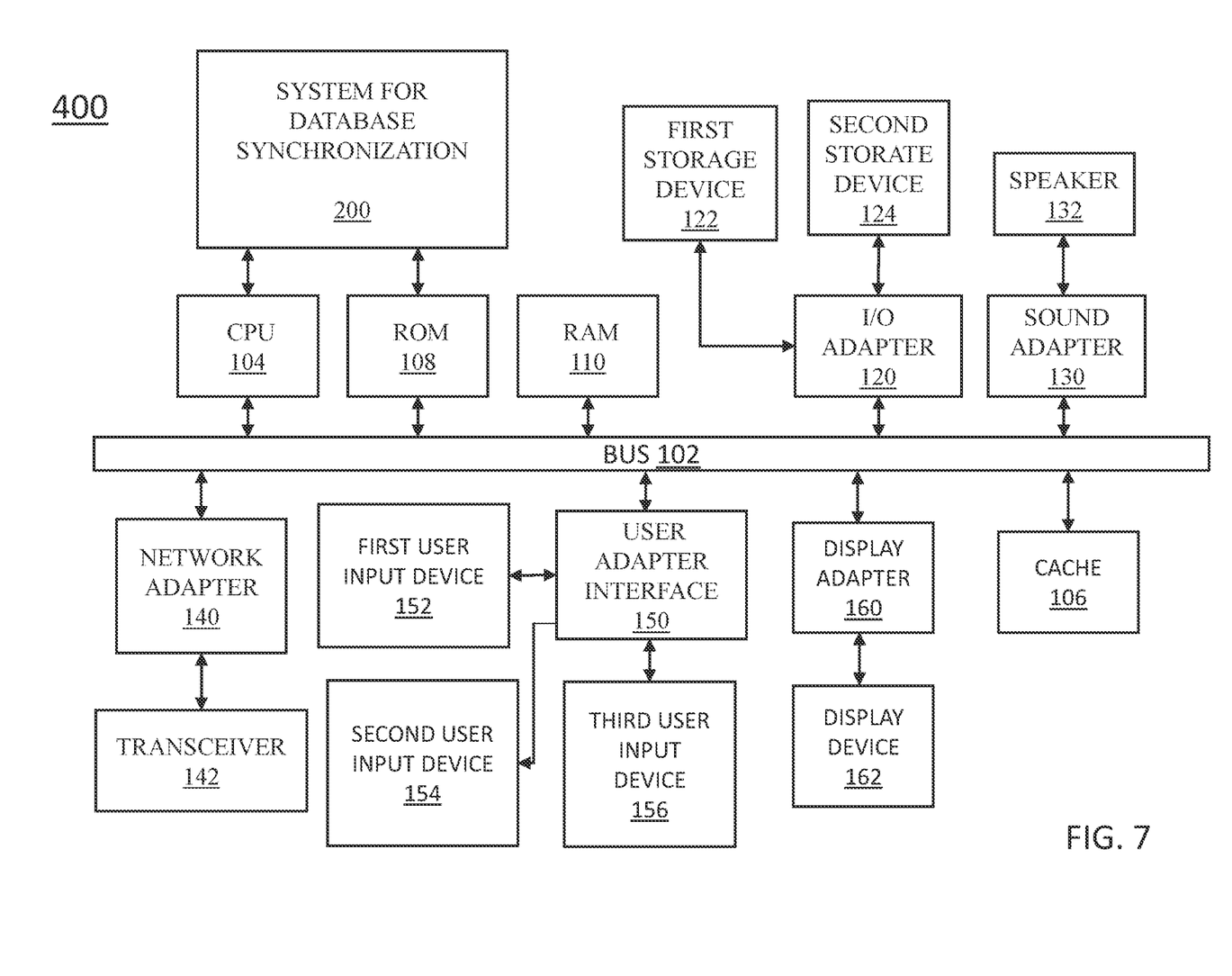
FIG. 7 is a block diagram illustrating a system that can incorporate the database synchronization system that is depicted in FIG. 6, in accordance with one embodiment of the present disclosure.

FIG. 7 illustrates a processing system 400 used by or comprised by the system 200 of FIG. 6, in accordance with the methods and systems described above in FIGS. 1-6. The bus 102 interconnects the plurality of components for the system 200 described above in FIG. 6 with the components depicted in the computer system 400 depicted in FIG. 7.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 7 shows the computer system 400 as a particular configuration of hardware and software, any configuration of hardware and software, as would be known to a person of ordinary skill in the art, may be utilized for the purposes stated supra in conjunction with the particular system 200 of FIG. 6. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for database synchronization that includes a computer readable storage medium having computer readable program code embodied therewith. The program instructions executable by a processor to cause the processor to initiate a transaction to synchronize data from a source database to a target database; and insert data from the source database into a synchronization (SYNC) table. The computer program product can also record, using the processor, a sequence for the data from the source database in the SYNC table; and generate, using the processor, multiple and parallel polling threads for transmitting data from source database to the target database. In some embodiments, the computer program product can record, using the processor, the data from the source database in the target database from the multiple and parallel polling threads using the sequence from the SYNC table.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (TOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 8:
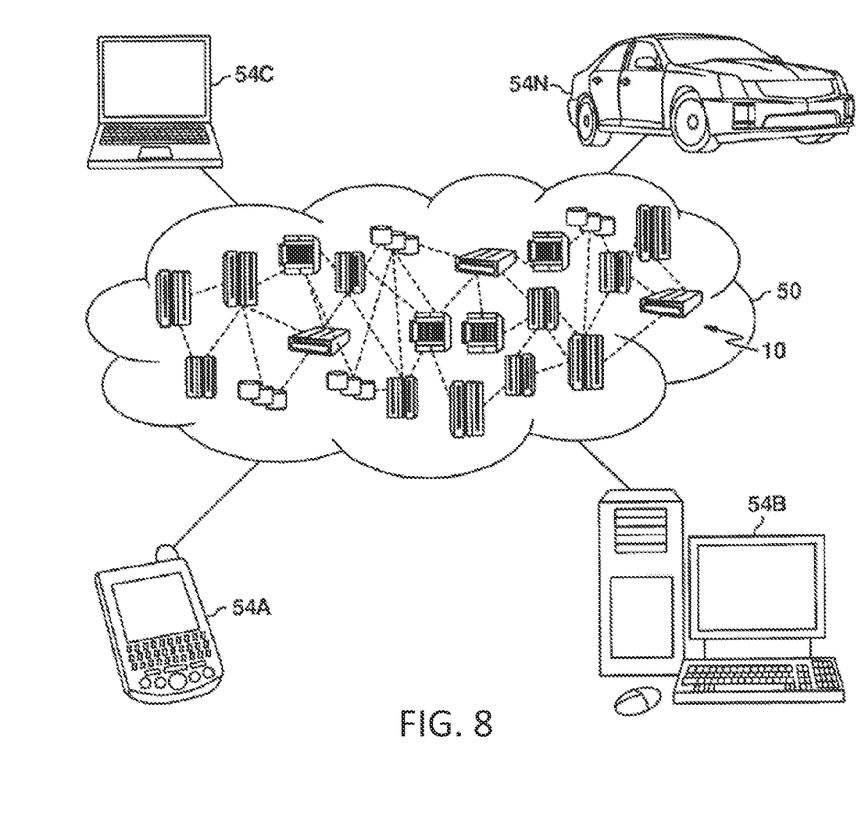
FIG. 8 depicts a cloud computing environment according to an embodiment of the present disclosure.

Referring now to FIG. 8, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
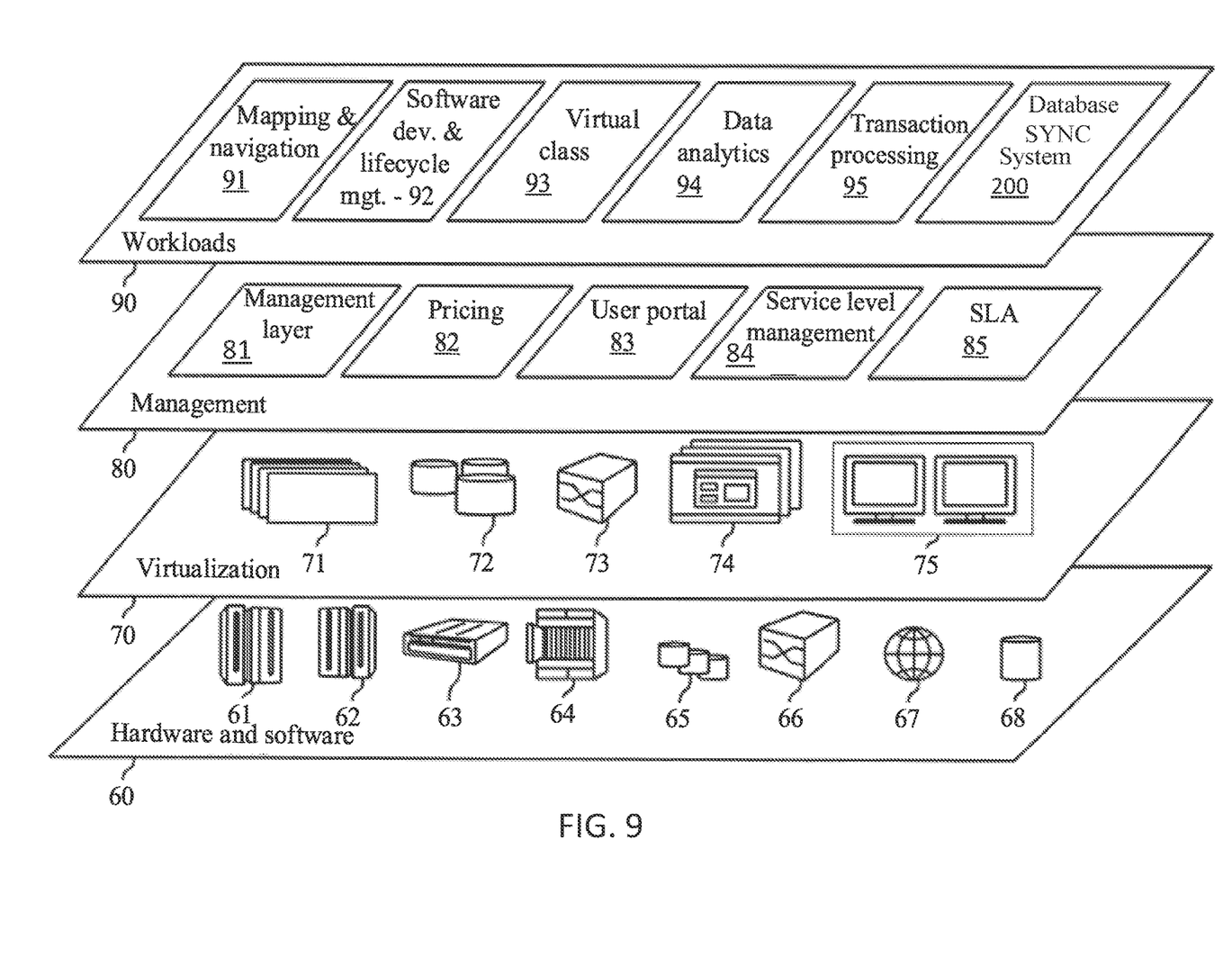
FIG. 9 depicts abstraction model layers according to an embodiment of the present disclosure.

Referring now to FIG. 9, a set of functional abstraction layers provided by cloud computing environment (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a system for database synchronization in accordance with FIGS. 1-8.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method for database synchronization comprising:
    initiating a transaction to synchronize data from a source database to a target database, wherein the source database contains a trigger that calculates a sequence identification (ID) and calculates a thread number that is employed for syncing the rows from the source database to the target database based on a primary key hash;
    inserting the sequence identification (ID) and the thread number from the source database into a synchronization (SYNC) table;
    selecting the rows that are allotted their thread number from the SYNC table using polling threads; and
    replicating the rows from the SYNC table into target storage to replicate data from the source database to the target database using a sequence provided by the sequence identification and thread number.

2. The computer-implemented method of claim 1, wherein the database synchronization comprises data from the source database provided by a relational database management systems (RDMS) database to the target database that is a non-relational (NoSQL) database.

3. The computer-implemented method of claim 1, wherein the database synchronization is selected from the group consisting of insert synchronization, update synchronization, drop synchronization and mixed synchronization.

4. The computer-implemented method of claim 1 further comprising tagging multiple and parallel polling threads with the sequence of the SYNC table.

5. The computer-implemented method of claim 1, wherein the source database includes columns and rows of data.

6. The computer-implemented method of claim 1 further comprising updates to the data from the source database prior to being recorded in the target database.

7. A system for database synchronization comprising:
    a hardware processor; and
    a memory that stores a computer program product, which, when executed by the hardware
    processor, causes the hardware processor to:
    initiate a transaction to synchronize data from a source database to a target database, wherein the source database contains a trigger that calculates a sequence identification (ID) and calculates a thread number that is employed for syncing the rows from the source database to the target database based on a primary key hash;
    insert the sequence identification (ID) and the thread number from the source database into a synchronization (SYNC) table;
    select the rows that are allotted their thread number from the SYNC table using polling threads; and
    replicate the rows from the SYNC into target storage to replicate data from the source database to the target database using a sequence provided by the sequence identification and thread number.

8. The system of claim 7, wherein multiple and parallel polling threads are simultaneously generated.

9. The system of claim 7, wherein the database synchronization comprises data from the source database provided by a relational database management systems (RDMS) database to the target database that is a non-relational (NoSQL) database.

10. The system of claim 7, wherein the database synchronization is selected from the group consisting of insert synchronization, update synchronization, drop synchronization and mixed synchronization.

11. The system of claim 7 further comprising tagging multiple and parallel polling threads with the sequence of the SYNC table.

12. The system of claim 7, wherein the source database includes columns and rows of data.

13. The system of claim 7 further comprising updates to the data from the source database prior to being recorded in the target database.

14. A computer program product for database synchronization comprising a computer readable storage medium having computer readable program code embodied therewith, the program instructions executable by a processor to cause the processor to:

initiate, using the processor, a transaction to synchronize data from a source database to a target database, wherein the source database contains a trigger that calculates a sequence identification (ID) and calculates a thread number that is employed for syncing the rows from the source database to the target database based on a primary key hash;

insert, using the processor, the sequence identification (ID) and the thread number from the source database into a synchronization (SYNC) table;

select, using the processor, the rows that are allotted their thread number from the SYNC table using polling threads; and     replicate, using the processor, the rows from the SYNC into target storage to replicate data from the source database to the target database using a sequence provided by the sequence identification and thread number.

15. The computer program product of claim 14, wherein multiple and parallel polling threads are simultaneously generated.

16. The computer program product of claim 14, wherein the database synchronization comprises data from the source database provided by a relational database management systems (RDMS) database to the target database that is a non-relational (NoSQL) database.

17. The computer program product of claim 14, wherein the database synchronization is selected from the group consisting of insert synchronization, update synchronization, drop synchronization and mixed synchronization.

18. The computer program product of claim 14 further comprising tagging multiple and parallel polling threads with the sequence of the SYNC table.

19. The computer program product of claim 14, wherein the source database includes columns and rows of data.

20. The computer program product of claim 14 further comprising updates to the data from the source database prior to being recorded in the target database.

* * * * *